(12) United States Patent
Yu et al.

(10) Patent No.: US 12,500,390 B2
(45) Date of Patent: Dec. 16, 2025

(54) DEPTH OBTAINING COMPONENT AND ELECTRONIC DEVICE

(71) Applicant: HUAWEI TECHNOLOGIES CO., LTD., Guangdong (CN)

(72) Inventors: Liqiang Yu, Shenzhen (CN); Zhenwei Cui, Wuhan (CN); Wei Chen, Shenzhen (CN); Yanfeng Jiang, Wuhan (CN); Junzhe Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 675 days.

(21) Appl. No.: 17/899,925

(22) Filed: Aug. 31, 2022

(65) Prior Publication Data

US 2023/0006418 A1   Jan. 5, 2023

Related U.S. Application Data

(63) Continuation of application No. PCT/CN2020/077476, filed on Mar. 2, 2020.

(51) Int. Cl.
*H01S 5/042* (2006.01)
*G01S 17/10* (2020.01)
*H01S 5/40* (2006.01)

(52) U.S. Cl.
CPC .......... *H01S 5/0428* (2013.01); *G01S 17/10* (2013.01); *H01S 5/4025* (2013.01)

(58) Field of Classification Search
CPC ...... H01S 5/0428; H01S 5/4025; G01S 17/10; G01S 7/4815; G01S 7/4863
See application file for complete search history.

(56) References Cited

U.S. PATENT DOCUMENTS 5,831,717 A * 11/1998 Ikebuchi ............... G01S 7/4868
356/5.1
9,835,853 B1   12/2017 Shpunt et al.
(Continued)

FOREIGN PATENT DOCUMENTS

CN   2917038 Y   6/2007
CN   101764352 A   6/2010
(Continued)

OTHER PUBLICATIONS

Chinese Office Action for Application No. 202080093606.9 dated Aug. 16, 2024, 9 pages.
(Continued)

*Primary Examiner* — James A Menefee

(57) ABSTRACT

A depth obtaining component includes a laser driver array and a laser array. The laser array includes a plurality of lasers. The laser driver array includes one or more control units, and each control unit is configured to control selection of one or more lasers in the laser array. The one or more control units are disposed in a charge loop of the laser driver array. A laser corresponding to the control unit can be flexibly selected based on a first switch module and a capacitive module in the control unit. In this way, scanning laser emission of the laser array can be implemented based on the laser drive circuit, no scanning device such as a micro electro mechanical systems mirror needs to be additionally disposed, and circuit support can be provided for implementing a small-sized, power-efficient, and cost-effective optical transmit end.

10 Claims, 16 Drawing Sheets

(56) References Cited

U.S. PATENT DOCUMENTS

| | | | |
|---|---|---|---|
| 2017/0085057 A1* | 3/2017 | Barnes | H01S 5/06808 |
| 2017/0350965 A1 | 12/2017 | Schmalenberg | |
| 2018/0259624 A1 | 9/2018 | Kiehn et al. | |
| 2020/0028436 A1 | 1/2020 | Glaser et al. | |
| 2020/0326425 A1* | 10/2020 | Donovan | G01S 7/4815 |

FOREIGN PATENT DOCUMENTS

| | | | |
|---|---|---|---|
| CN | 104812132 A | 7/2015 | |
| CN | 109343025 A | 2/2019 | |
| CN | 109884653 A | 6/2019 | |
| CN | 110710072 A | 1/2020 | |
| DE | 102016116875 A1 | 3/2017 | |
| EP | 3267227 A1 | 1/2018 | |
| JP | H07167958 A | 7/1995 | |
| JP | 2016188808 A | 11/2016 | |
| JP | 2017090144 A | 5/2017 | |
| JP | 2019068528 A | 4/2019 | |
| JP | 2022516854 A | 3/2022 | |
| WO | 2017176410 A1 | 10/2017 | |
| WO | 2018125825 A1 | 7/2018 | |
| WO | WO 2018/191808 A1 * | 10/2018 | G01S 17/10 |

OTHER PUBLICATIONS

European Search Report for Application No. 20923651 dated Feb. 24, 2023, 7 pages.

Notice of Reasons for Rejection for Application No. 2022-552627 dated Oct. 2, 2023, 10 pages.

\* cited by examiner

DEPTH OBTAINING COMPONENT AND ELECTRONIC DEVICE

CROSS-REFERENCE TO RELATED DISCLOSURES

This application is a continuation of International Application No. PCT/CN2020/077476, filed on Mar. 2, 2020, the disclosure of which is hereby incorporated by reference in its entirety.

TECHNICAL FIELD

This application relates to the field of electrical technologies, and in particular, to a depth obtaining component and an electronic device.

BACKGROUND

With development of terminal devices, the terminal devices may gradually implement depth image photographing. A principle of implementing depth image photographing by a terminal device may be shown in FIG. 1. A terminal device 11 emits light, the light returns to the terminal device 11 after reaching a photographing target 12, and the terminal device 11 implements depth information collection based on round-trip duration of the light.

Generally, a terminal device having a depth image photographing function may include an optical transmit end and an optical receive end. The optical transmit end usually includes a laser source configured to output light. To implement scanning of the laser source, a micro electro mechanical systems mirror (MEMS mirror) needs to be disposed at the transmit end. A light beam emitted by the laser source implements angle scanning by using the micro electro mechanical systems mirror, and then is irradiated to to-be-measured objects at different angles, to implement depth ranging at a specific field of view.

However, a size of a micro electro mechanical systems mirror in the conventional technology is large. Consequently, a size of an optical transmit end is large, and power consumption and costs are high.

SUMMARY

Embodiments of this application provide a depth obtaining component and an electronic device, to provide circuit support for implementing a small-sized and power-efficient optical transmit end.

According to a first aspect, an embodiment of this application provides a depth obtaining component including a laser driver array and a laser array. The laser array includes a plurality of lasers, the laser driver array includes one or more control units, and each control unit is configured to control selection of one or more lasers in the laser array. The control unit includes a first switch module, a capacitive module, and a first connection end. The first connection end is configured to connect to a positive electrode of the laser. The first switch module is configured to select, based on a first control signal, the laser corresponding to the control unit. One end of the first switch module is electrically connected to a voltage input end of the laser driver array, and the other end of the first switch module is electrically connected to the first connection end. One end of the capacitive module is electrically connected to the first connection end, and the other end of the capacitive module is grounded. In this embodiment of this application, the one or more control units are disposed in a charge loop of the laser driver array, and the laser corresponding to the control unit can be flexibly selected based on the first switch module and the capacitive module in the control unit. In this way, scanning laser emission of the laser array can be implemented based on the laser driver array, no scanning device such as a micro electro mechanical systems mirror needs to be additionally disposed, and circuit support can be provided for implementing a small-sized, power-efficient, and cost-effective optical transmit end.

In a possible design, the first switch module includes a field-effect transistor, an inductive electrical component, and a unidirectionally-conducted electrical component. The field-effect transistor, the inductive electrical component, and the unidirectionally-conducted electrical component are connected in series. A gate of the field-effect transistor is configured to receive the first control signal; and a negative electrode of the unidirectionally-conducted electrical component is connected to the first connection end. The inductive electrical component is connected in series to the charge loop to form an LC circuit model, so that charge efficiency can be improved, and a requirement on an input voltage of the voltage input end can also be reduced.

In a possible design, the depth obtaining component further includes one or more first pulse current generation units. The first pulse current generation unit includes a second connection end, the first pulse current generation unit is configured to control, based on a pulse period of a second control signal, the second connection end to discharge periodically, and the second connection end is configured to connect to a negative electrode of the laser. In this way, a pulse current may be generated in the laser, and the laser may emit pulse light.

In a possible design, the first pulse current generation unit further includes a first field-effect module and a drive module corresponding to the first field-effect module. The drive module corresponding to the first field-effect module is configured to receive the second control signal. The first field-effect module is configured to control, based on the pulse period of the second control signal, the second connection end to discharge periodically.

In a possible design, negative electrodes of the plurality of lasers are electrically connected, and each control unit is configured to control one laser. Control logic for each control unit to control one laser is simple, and the laser can be conveniently controlled.

In a possible design, each control unit is configured to select one row of lasers, and positive electrodes of the row of lasers are electrically connected. The laser drive circuit further includes one or more second switch modules. Each second switch module is configured to select one column of lasers, and the second switch module is electrically connected to negative electrodes of the column of lasers. The one or more second switch modules and the first switch modules of the one or more control units are configured to cooperate with each other to select any laser. In this way, any laser may be selected based on cooperation between the first switch module and the second switch module.

In a possible design, the laser drive circuit further includes one or more second pulse current generation units. The second pulse current generation unit is connected to the one or more second switch modules, and the second pulse current generation unit is configured to control, based on a pulse period of a third control signal, a laser corresponding to the one or more second switch modules to discharge periodically.

In a possible design, the second pulse current generation unit further includes a second field-effect module and a drive module corresponding to the second field-effect module. The drive module corresponding to the second field-effect module is configured to receive the third control signal. The second field-effect module is configured to control, based on the pulse period of the third control signal, the laser connected to the one or more second switch modules to discharge periodically. In this way, the lasers can be flexibly controlled in a unit of row.

In a possible design, the second switch module includes a third field-effect module and a drive module corresponding to the third field-effect module. The drive module corresponding to the third field-effect module is configured to receive a fourth control signal. The third field-effect module is configured to control, based on a pulse period of the fourth control signal, a laser corresponding to the third field-effect module to discharge periodically.

In a possible design, the capacitive module includes a capacitor.

According to a second aspect, an embodiment of this application provides a laser drive circuit including one or more control units and a voltage input end.

The control unit includes a first switch module, a capacitive module, and a first connection end. The first connection end is configured to connect to a positive electrode of a laser. The first switch module is configured to select, based on a first control signal, the laser corresponding to the control unit. One end of the first switch module is electrically connected to the voltage input end, and the other end of the first switch module is electrically connected to the first connection end. One end of the capacitive module is electrically connected to the first connection end, and the other end of the capacitive module is grounded. In this embodiment of this application, the one or more control units are disposed in a charge loop of the laser drive circuit, and the laser corresponding to the control unit can be flexibly selected based on the first switch module and the capacitive module in the control unit. In this way, scanning laser emission of the laser array can be implemented based on the laser drive circuit, no scanning device such as a micro electro mechanical systems mirror needs to be additionally disposed, and circuit support can be provided for implementing a small-sized, power-efficient, and cost-effective optical transmit end.

In a possible design, the first switch module includes a field-effect transistor, an inductive electrical component, and a unidirectionally-conducted electrical component. The field-effect transistor, the inductive electrical component, and the unidirectionally-conducted electrical component are connected in series. A gate of the field-effect transistor is configured to receive the first control signal; and a negative electrode of the unidirectionally-conducted electrical component is connected to the first connection end. The inductive electrical component is connected in series to the charge loop to form an LC circuit model, so that charge efficiency can be improved, and a requirement on an input voltage of the voltage input end can be reduced.

In a possible design, the laser drive circuit further includes one or more first pulse current generation units. The first pulse current generation unit includes a second connection end, the first pulse current generation unit is configured to control, based on a pulse period of a second control signal, the second connection end to discharge periodically, and the second connection end is configured to connect to a negative electrode of the laser. In this way, a pulse current may be generated in the laser, and the laser may emit pulse light.

In a possible design, the first pulse current generation unit further includes a first field-effect module and a drive module corresponding to the first field-effect module. The drive module corresponding to the first field-effect module is configured to receive the second control signal. The first field-effect module is configured to control, based on the pulse period of the second control signal, the second connection end to discharge periodically.

In a possible design, negative electrodes of a plurality of lasers are electrically connected, and each control unit is configured to control one laser. Control logic for each control unit to control one laser is simple, and the laser can be conveniently controlled.

In a possible design, each control unit is configured to select one row of lasers, and positive electrodes of the row of lasers are electrically connected. The laser drive circuit further includes one or more second switch modules. Each second switch module is configured to select one column of lasers, and the second switch module is electrically connected to negative electrodes of the column of lasers. The one or more second switch modules and the first switch modules of the one or more control units are configured to cooperate with each other to select any laser. In this way, any laser may be selected based on cooperation between the first switch module and the second switch module.

In a possible design, the laser drive circuit further includes one or more second pulse current generation units. The second pulse current generation unit is connected to the one or more second switch modules, and the second pulse current generation unit is configured to control, based on a pulse period of a third control signal, a laser corresponding to the one or more second switch modules to discharge periodically.

In a possible design, the second pulse current generation unit further includes a second field-effect module and a drive module corresponding to the second field-effect module. The drive module corresponding to the second field-effect module is configured to receive the third control signal. The second field-effect module is configured to control, based on the pulse period of the third control signal, the laser connected to the one or more second switch modules to discharge periodically. In this way, the lasers can be flexibly controlled in a unit of row.

In a possible design, the second switch module includes a third field-effect module and a drive module corresponding to the third field-effect module. The drive module corresponding to the third field-effect module is configured to receive a fourth control signal. The third field-effect module is configured to control, based on a pulse period of the fourth control signal, a laser corresponding to the third field-effect module to discharge periodically.

In a possible design, the capacitive module includes a capacitor.

According to a third aspect, this application provides an electronic device, including a depth obtaining component according to the first aspect and the possible implementations of the first aspect.

The electronic device may include but is not limited to a terminal device such as a mobile phone, a tablet computer, a desktop computer, a notebook computer, a camera, or a wearable device.

For beneficial effects of the electronic device provided in the third aspect and the possible designs of the third aspect, refer to the beneficial effects brought by the first aspect and the possible implementations of the first aspect. Details are not described herein again.

DESCRIPTION OF EMBODIMENTS

Figure 1:
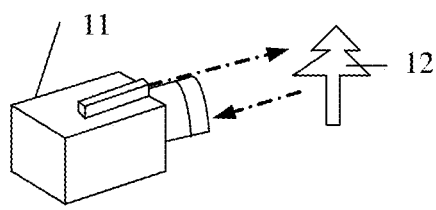
FIG. 1 is a schematic diagram of a depth image obtaining scenario.

To make the objectives, technical solutions, and advantages of embodiments of this application clearer, the following clearly describes the technical solutions in embodiments of this application with reference to accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

In embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" usually indicates an "or" relationship between the associated objects.

In addition, in embodiments of this application, the terms "first", "second", "third", and the like (if any) are intended to distinguish between similar objects but do not necessarily indicate a specific order or sequence. It should be understood that data termed in such a way are interchangeable in proper circumstances, so that embodiments of this application described herein can be implemented in orders except the order illustrated or described herein.

Manners of obtaining a depth image by a terminal device may be classified into two types based on whether a laser source is required: passive ranging sensing and active depth sensing. In the manner of passive ranging sensing, the terminal device does not need to transmit light by using the laser source. In the manner of active depth sensing, the terminal device needs to transmit light by using the laser source.

In the passive ranging sensing, a binocular stereoscopic vision (or referred to as red green blue (RGB) binocular) technology may be used. In a possible implementation, two images in a same scenario may be simultaneously captured by using two cameras that are at a specific distance away from each other, corresponding pixels in the two images are found according to a stereoscopic matching algorithm, and parallax information is calculated according to a triangle principle. The parallax information may represent depth information of an object in the scenario through conversion. In another possible implementation, a depth image of a scenario may be obtained, according to the stereoscopic matching algorithm, by photographing a group of images at different angles in the same scenario. In addition, depth information may be obtained through indirect estimation by analyzing features such as a luminosity feature and a brightness feature of an image.

It may be understood that, in the manner of passive ranging sensing, calculation of a depth image is usually related to a pixel of the image. Therefore, the depth image is usually obtained based on a color image.

In the manner of active depth sensing, a measurement principle may be described corresponding to FIG. 1, and obtaining of a depth image may be independent of obtaining of a color image. Technologies, such as a time of flight (TOF) technology, a structured light technology, and the like, may be used in the manner of active depth sensing. The TOF technology may include an indirect time of flight (ITOF) technology and a direct time of flight (DTOF) technology.

Table 1 shows comparison between the ITOF technology, the DTOF technology, the RGB binocular technology, and the structured light technology in obtaining of a depth image.

TABLE 1

| | Ranging sensing technology | | | |
|---|---|---|---|---|
| | ITOF | DTOF | RGB binocular | Structured light |
| Distance measurement manner | Active | Active | Passive | Active |
| Working Principle | Indirect measurement based on a time of flight of light | Direct measurement based on a time of flight of light | RGB image feature point matching, and triangulation indirect calculation | Active projection of a known code pattern to improve feature matching effect |
| Measurement precision | Up to centimeter-level precision | Up to centimeter-level precision | Up to millimeter-level precision within a short distance | Up to high precision within a short distance from 0.01 mm to 1 mm |
| Measurement distance | <5 m | >100 m | <1 m | <5 m |
| Hardware size | Small | Large | Small | Small |
| Power consumption | <1 W | >8 W | <1 W | <1 W |

It can be learned that measurement distances of the ITOF technology, the RGB binocular technology, and the structured light technology that have low power consumption and small hardware sizes are short. The DTOF technology whose measurement distance is long has high power consumption and a large hardware size.

Due to limitations of a size and power consumption of a mobile terminal such as a mobile phone, a current DTOF technology with high power consumption and a large hardware size cannot be applied to the mobile terminal such as the mobile phone.

With development of the mobile terminal such as the mobile phone, the mobile terminal such as the mobile phone has an increasingly high requirement on a distance in a depth image. Therefore, it is expected that the DTOF technology is implemented in the mobile terminal such as the mobile phone, and a size and power consumption of hardware for implementing the DTOF technology need to be sufficiently small, in order to meet requirements of the mobile terminal such as the mobile phone on the hardware size and power consumption.

In realization of the DTOF technology in an implementation, the more important part is to realize scanning of objects to be measured by a laser source.

For example, when the DTOF technology is applied to depth ranging of a self-driving light detection and ranging (LIDAR) system, light emitted by a laser source needs to scan a specific spatial angle.

Figure 2:
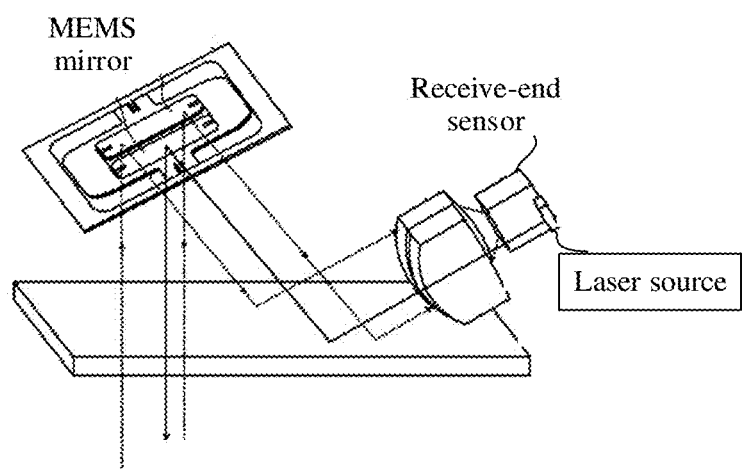
FIG. 2 is a schematic diagram of a possible scanning structure.

For example, FIG. 2 is a schematic diagram of an implementation of a DTOF technology in the LIDAR system. To implement scanning of the laser source, a light beam from the laser source first passes through an MEMS mirror, angle scanning is implemented by using the MEMS mirror, to-be-measured objects at different angles are irradiated by the light beam, and then the light beam returns to a receive-end sensor. In this way, depth ranging at a specific field of view is implemented.

Figure 3:
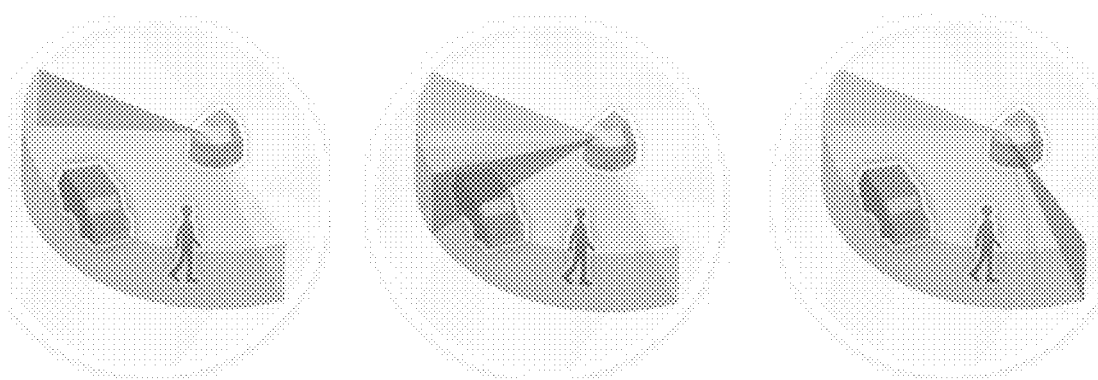
FIG. 3 is a schematic scanning diagram of a depth measurement technology.

For example, FIG. 3 is a schematic diagram of three times of scanning in a scanning process in a self-driving DTOF technology. In each time of scanning, it is assumed that a spatial angle scanned by the laser beam emitted by the laser source is θ, and a divergence angle of the laser beam is φ. Therefore, fields of view (FOV) of the laser and a DTOF system both are θ×φ.

However, in the implementation of the DTOF technology in FIG. 2, because the micro electro mechanical systems mirror needs to be disposed, a hardware size is large. In addition, because the micro electro mechanical systems mirror needs to rotate frequently, problems of high power consumption, low reliability, and a short service life of a device may further exist. Therefore, the DTOF technology cannot be applied to a device that has low requirements on both a hardware size and power consumption.

Further, implementation of laser source scanning in the DTOF technology is analyzed. Essence of the laser source scanning is to implement block scanning on an irradiated scenario.

Figure 4:
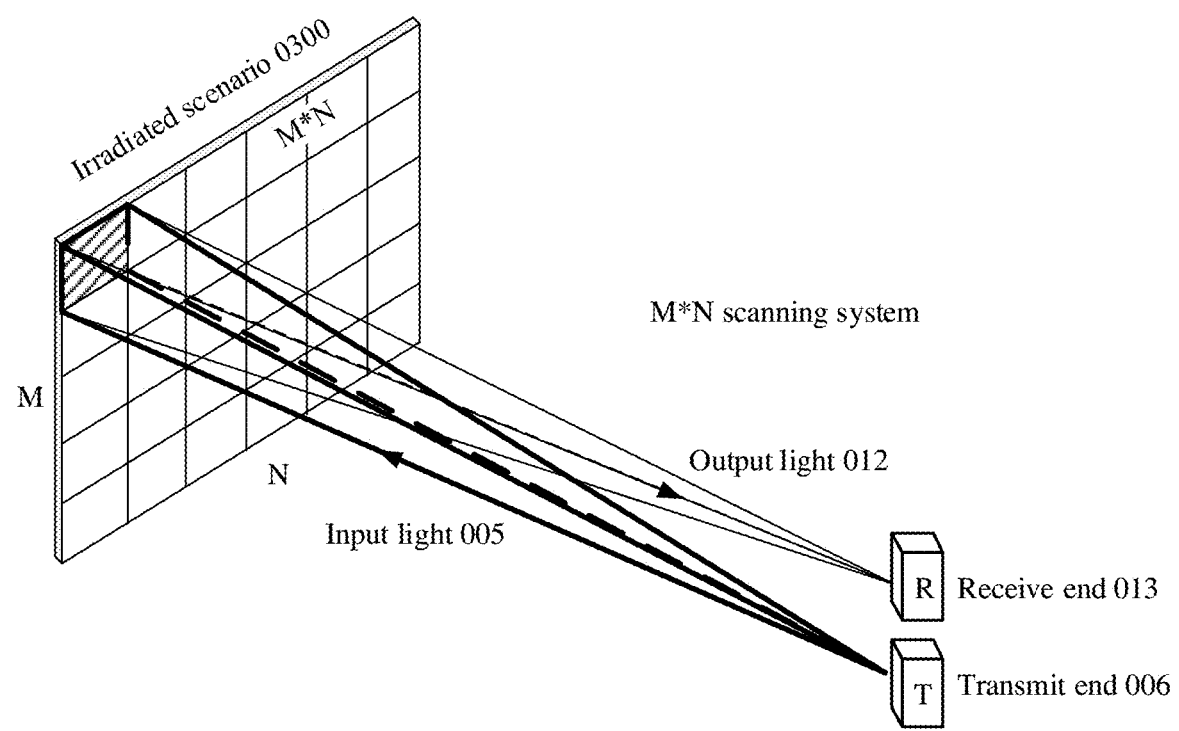
FIG. 4 is a schematic scanning diagram of an irradiated scenario.
Figure 5:
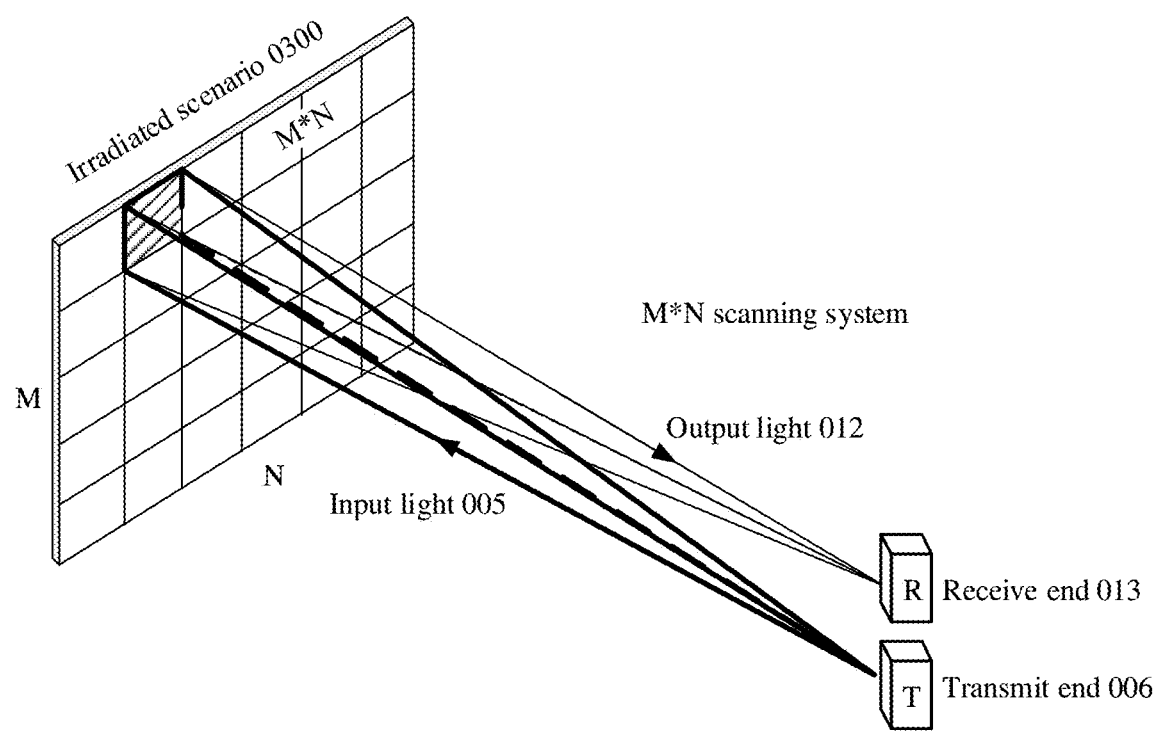
FIG. 5 is a schematic scanning diagram of another irradiated scenario.
Figure 6:
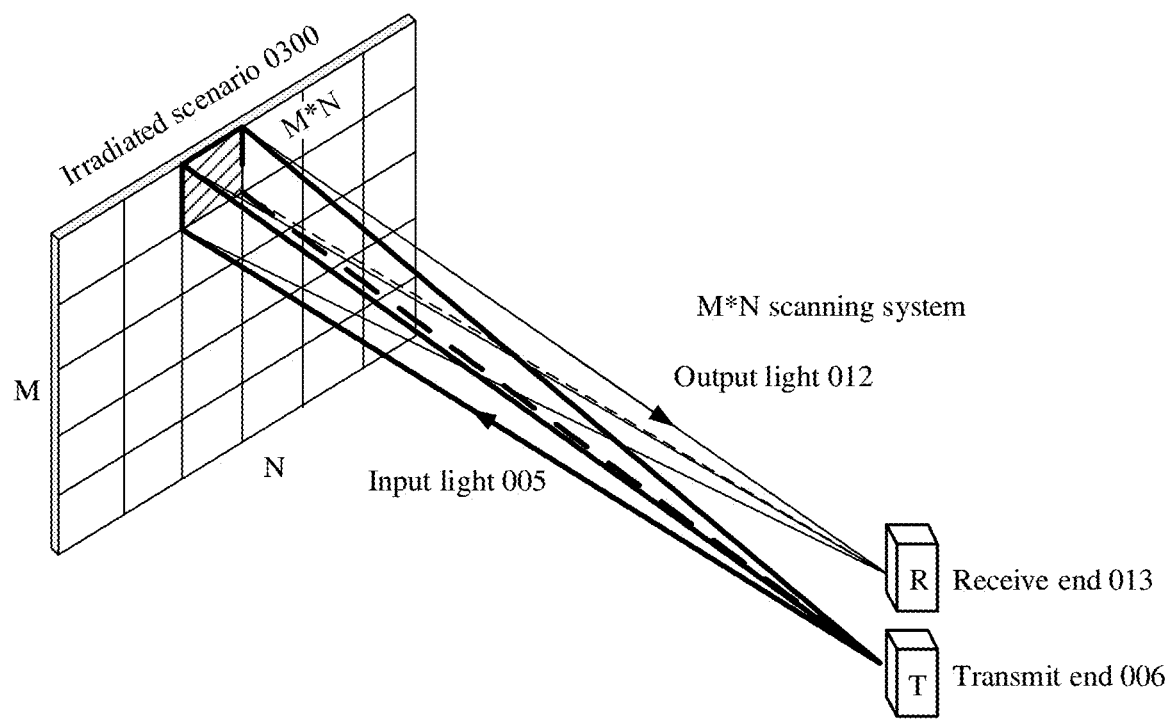
FIG. 6 is a schematic scanning diagram of still another irradiated scenario.
Figure 7:
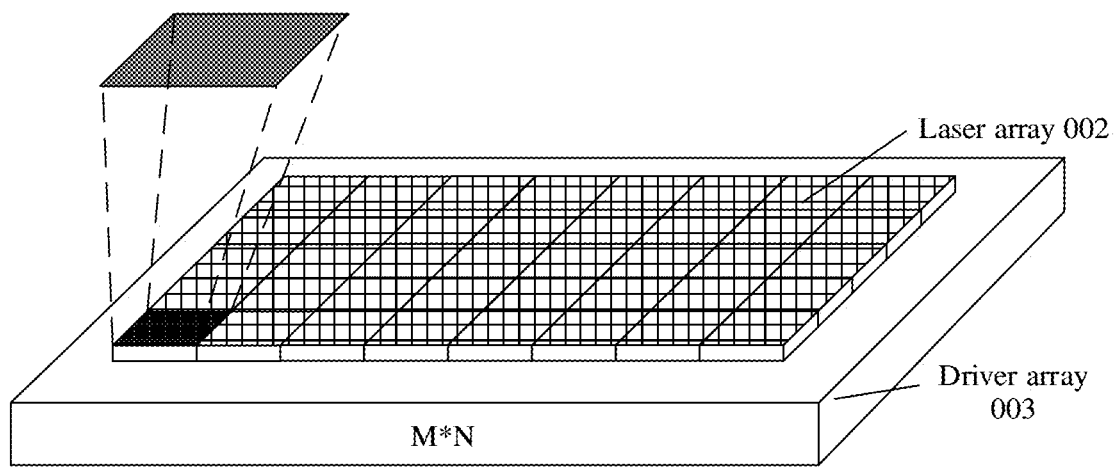
FIG. 7 is a schematic diagram of a first laser selection scenario.
Figure 8:
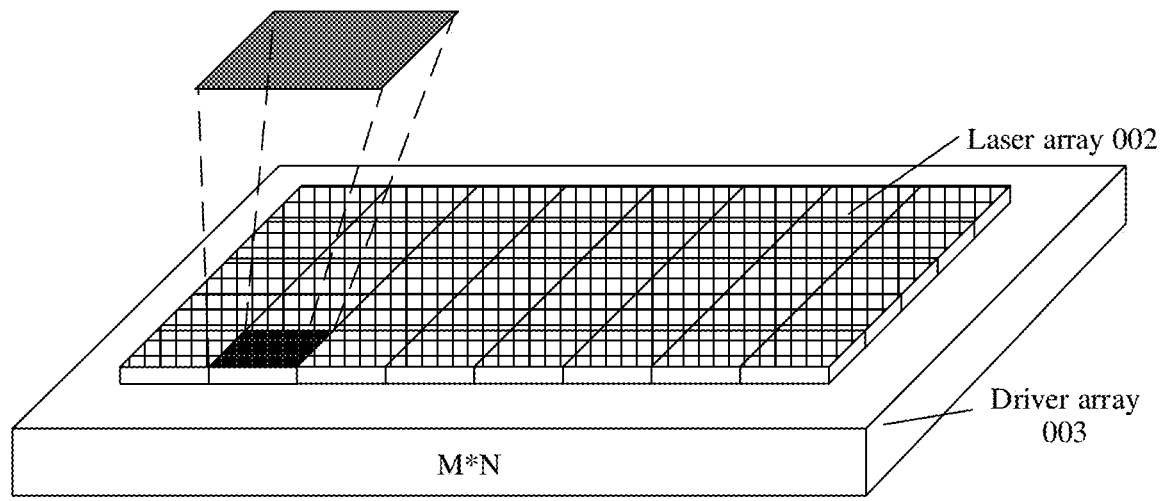
FIG. 8 is a schematic diagram of a second laser selection scenario.
Figure 9:
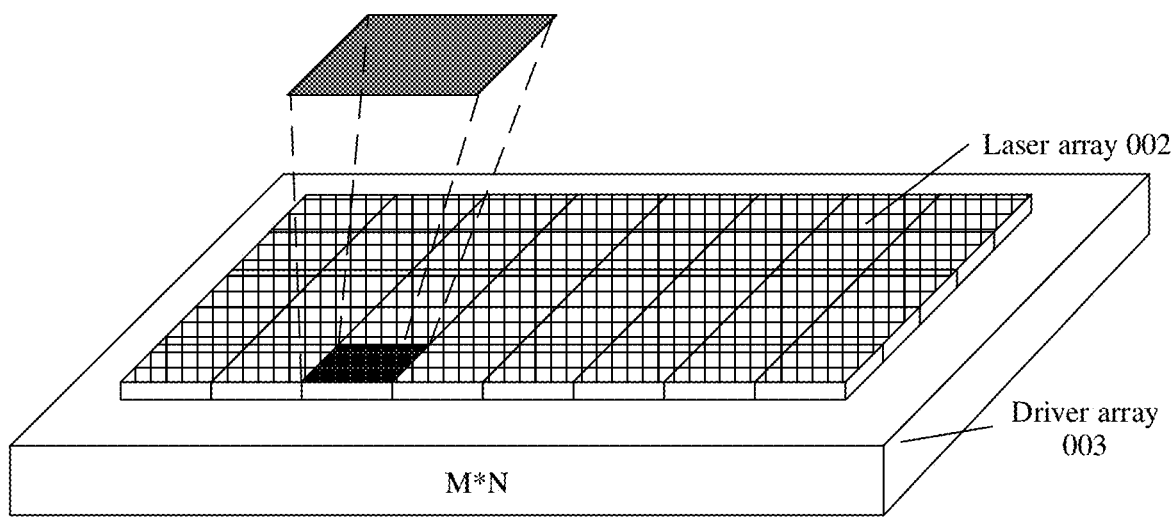
FIG. 9 is a schematic diagram of a third laser selection scenario.

For example, FIG. 4, FIG. 5, and FIG. 6 are schematic diagrams of three scanning processes of the irradiated scenario.

As shown in FIG. 4 to FIG. 6, when M*N (both M and N are positive integers) blocks in an irradiated scenario 0300 are scanned, the M*N scenario blocks may be separately scanned by adjusting an angle of output light 005 emitted by a transmit end 006. In each time of scanning, the output light 005 transmitted by a laser source at the transmit end 006 may scan and irradiate one of the M*N scenario blocks, and a receive end 013 may receive input light 012 returned from the one of the scenario blocks, to calculate a depth of the one of the scenario blocks based on round-trip duration of the output light 005 and the input light 012.

A possible manner for implementing scanning of the M*N blocks in the irradiate scenario may be: separately turning on respective ones of M*N lasers in a laser array, where each laser may implement scanning and irradiation on one of the scenario blocks.

For example, FIG. 7, FIG. 8, FIG. 9, FIG. 10, and FIG. 11 are schematic diagrams of implementing scanning of the irradiated scenario based on the M*N laser array.

Figure 10:
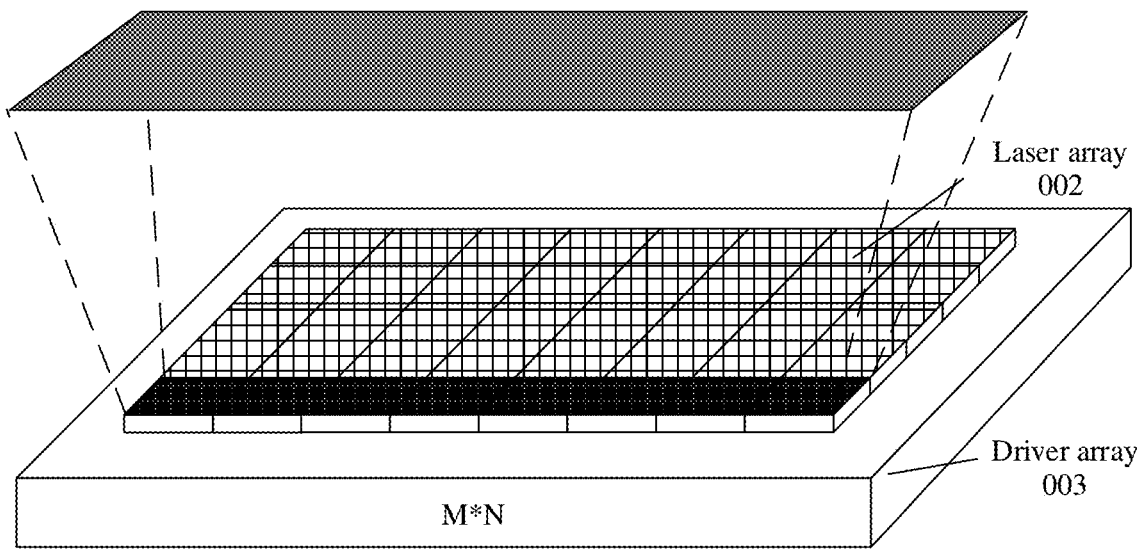
FIG. 10 is a schematic diagram of a fourth laser selection scenario.
Figure 11:
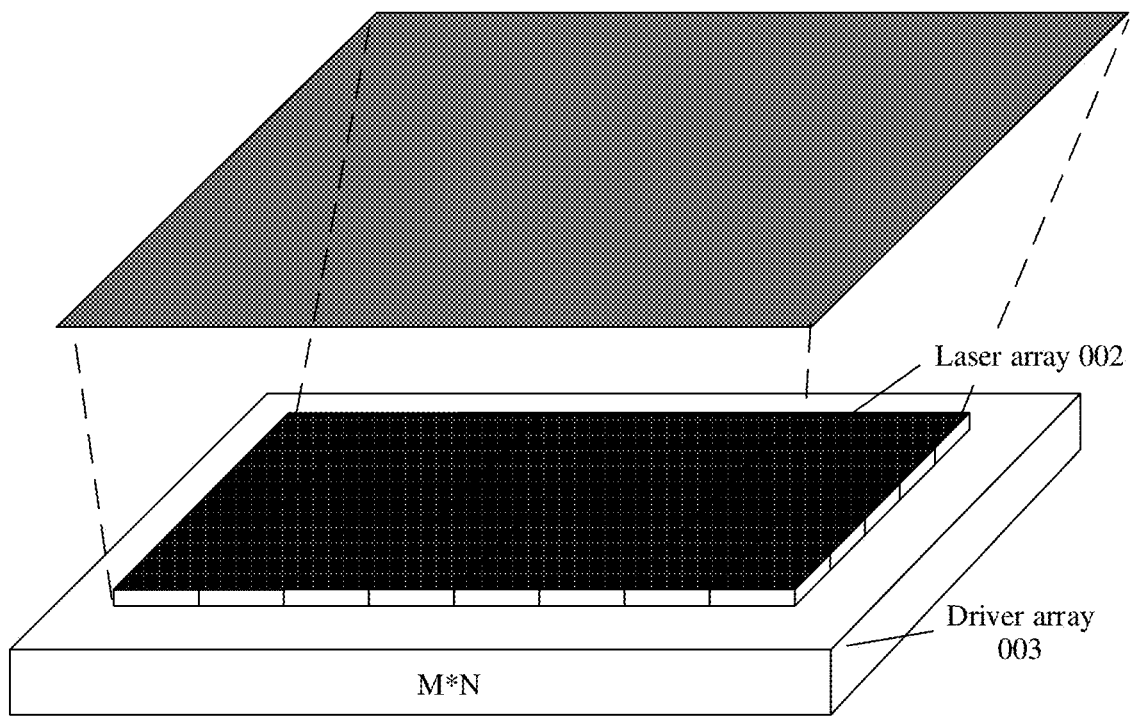
FIG. 11 is a schematic diagram of a fifth laser selection scenario.

As shown in FIG. 7 to FIG. 11, a driver array 003 may separately drive one or more lasers in a laser array 002 to turn on, and each turned-on laser may implement scanning of an area corresponding to the laser. For example, in FIG. 7, FIG. 8, and FIG. 9, one laser may be turned on each time, to scan one scenario block. In FIG. 10, a row of lasers may be turned on at the same time, to implement scanning and irradiation on a row of scenario blocks. In FIG. 11, all lasers may be turned on at the same time, to implement complete scanning and irradiation on the irradiated scenario.

That is, based on flexible selection of the lasers in the laser array, flexible scanning and irradiation on the irradiated scenario are implemented.

When the flexible selection of the lasers is implemented, a solution that may be figured out is that the M*N lasers in the laser array are disposed independently. In a laser array shown in FIG. 12, hollow connection points represent crosses without electrical connections, in other words, a P-electrode and an N-electrode of each laser are independent of each other. Therefore, different field-effect transistors may be used as switches to separately control the lasers, to implement the flexible selection of the lasers.

Figure 12:
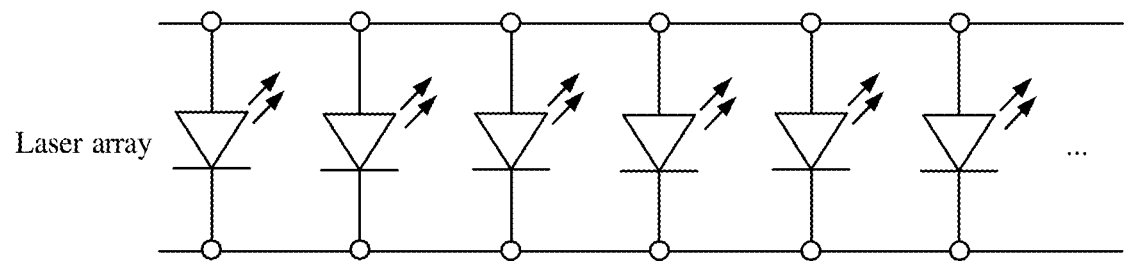
FIG. 12 is a schematic diagram of a structure of a laser array.
Figure 13:
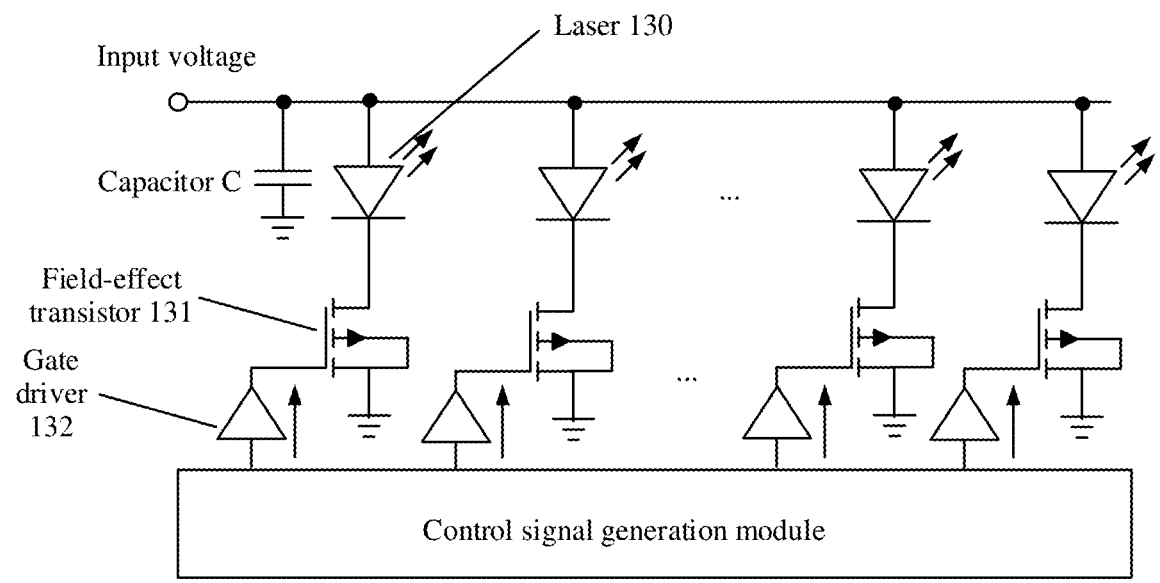
FIG. 13 is a schematic diagram of a laser array drive circuit.

For example, FIG. 13 shows a laser array and a drive circuit corresponding to FIG. 12. For one of lasers 130, a field-effect transistor 131 and a gate driver 132 of the field-effect transistor 131 may be disposed in a discharge loop of the laser (due to a unidirectionally-conducted feature of a laser, a loop formed by electrical components connected to a positive electrode of the laser is generally referred to as a charge loop, and a loop formed by electrical components connected to a negative electrode of the laser is referred to as a discharge loop). The field-effect transistor 131 may be controlled to be turned on or off based on a control signal generated by a control signal generation module. When the field-effect transistor 131 is turned on, the laser 130 is grounded, and a current passes through the laser 130, to turn on the laser.

However, in the laser array and the drive circuit shown in FIG. 13, because independent lasers are used, sizes of the lasers and M*N field-effect transistors in M*N areas are extremely large. Therefore, the laser array and the drive circuit are not suitable for an application scenario in which a mobile phone has an extremely high requirement on a size (e.g., require that the size be small).

Figure 14:
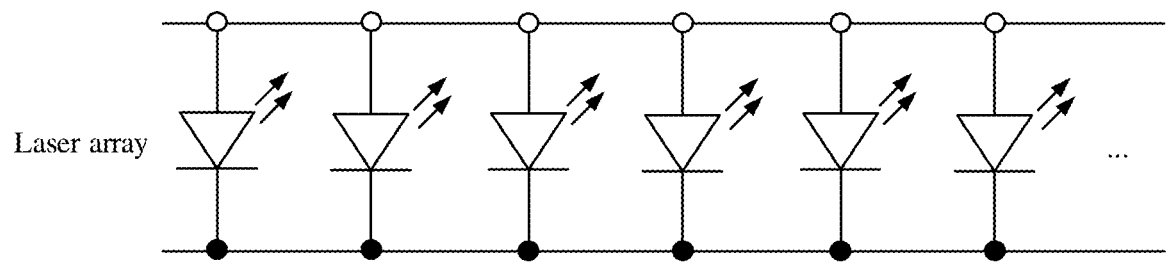
FIG. 14 is a schematic diagram of another structure of a laser array.

For a laser array used in the mobile phone that has the high requirement on the size, generally, N electrodes of all lasers in the laser array are connected together. FIG. 14 shows a laser array in which N electrodes are connected. Hollow connection points represent crosses without electrical connections, and solid connection points represent crosses with electrical connections.

Figure 15:
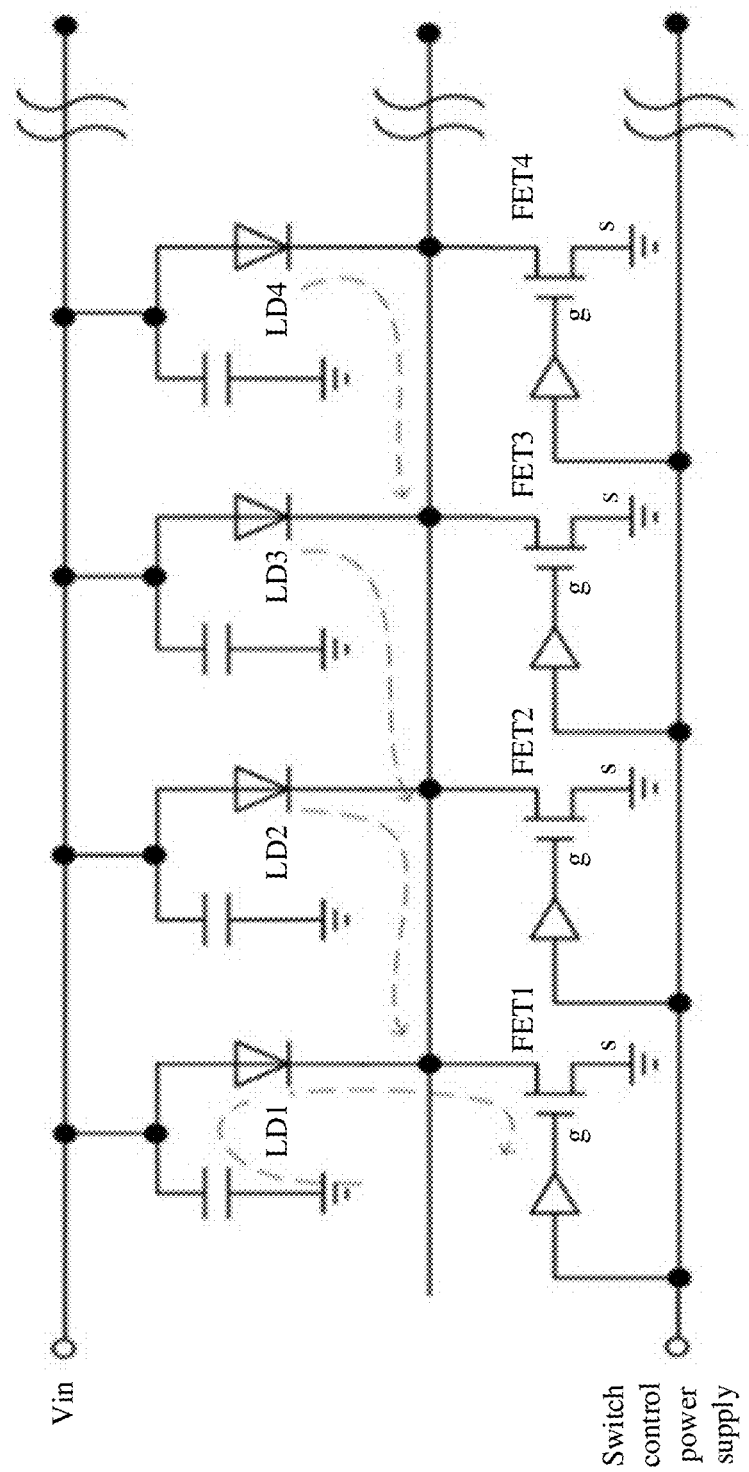
FIG. 15 is a schematic diagram of a possible laser array drive circuit.

For the laser array in FIG. 14, with reference to a laser control concept in FIG. 13, a solution that may be figured out is that: As shown in FIG. 15, a field-effect transistor and a corresponding gate driver are disposed in a discharge loop of each laser, to control, based on a control signal, the field-effect transistor to be turned on or off.

However, N electrodes of lasers are connected together. Therefore, if a field-effect transistor is turned on, a current passes through all the lasers, and all the lasers are turned on. Therefore, a drive solution in FIG. 15 cannot implement flexible selection of a laser.

Based on this, embodiments of this application provide a laser drive circuit. A laser is not controlled in a discharge loop. Instead, one or more control units are disposed in a charge loop of the laser drive circuit. A first switch module and a capacitive module in the control unit may form a charge-discharge loop, so that flexible selection of a laser is implemented. Therefore, a laser array can be scanned based on the laser drive circuit, and no scanning device such as a micro electro mechanical systems mirror needs to be additionally disposed. In this way, circuit support can be provided for implementing a small-sized, power-efficient, and cost-effective optical transmit end.

In a specific application, setting the control unit in the charge loop not only can implement the flexible selection of the laser, but also can be better than controlling the laser in the discharge loop in other aspects.

For example, in a DTOF implementation, a pulse current of the discharge loop is of a peak value (for example, up to 60 A), a high repetition rate (for example, up to 5 MHz), and a short rise/fall time period (for example, lower to 1 ns). This imposes very high requirements on an electrical switch disposed in the discharge loop. Due to these performance requirements, a GaN-based MOS transistor needs to be used for selection of the switch, which causes high costs and a large volume of the switch. Especially when the M*N array is large, the conflict is more prominent.

However, a very high repetition rate (for example, typically 30 Hz to 120 Hz) is not required in the charge loop. A peak current of the charge loop can be adjusted to be far lower than an actual working pulse current. A charge time period does not need to be at a nanosecond level, and only needs to be at a millisecond level to meet the requirements. Therefore, setting the control unit in the charge loop can greatly reduce the requirements on the switch, and reduce a size and costs of a switch circuit.

The following first describes terms in embodiments of this application.

An electrical connection described in embodiments of this application may include a connection implemented through a wire, electromagnetic, an electrical component, or the like. A current may flow between two devices that are electrically connected.

A switch module described in embodiments of this application may be a field-effect transistor (FET). For example, the field-effect transistor may include three types: a junction field-effect transistor (JFET), a metal-oxide semiconductor field-effect transistor (MOSFET), and a V-groove metal-oxide semiconductor field-effect transistor (VMOSFET). The MOSFET may include two types: an N-type metal-oxide semiconductor field-effect transistor (NMOSFET, NMOS transistor for short) and a P-type metal-oxide semiconductor field-effect transistor (PMOSFET, PMOS transistor for short). Alternatively, the switch module may be a device configured to implement a similar function of a field-effect transistor, such as an integrated chip. This is not specifically limited in embodiments of this application.

A capacitive module described in embodiments of this application has an energy storage feature, and may be charged or discharged based on a circuit status. For example, the capacitive module may be a capacitor, a capacitor component, or a chip, a component, or the like that can implement a function similar to that of a capacitor. This is not specifically limited in embodiments of this application.

An inductive electrical component described in embodiments of this application may be an inductor, an inductor component, or a chip, a component, or the like that can implement a function similar to that of an inductor. This is not specifically limited in embodiments of this application.

A unidirectionally-conducted component described in embodiments of this application may be a diode, a diode component, or a chip, a component, or the like that can implement a unidirectionally-conducted function. This is not specifically limited in embodiments of this application.

Figure 16:
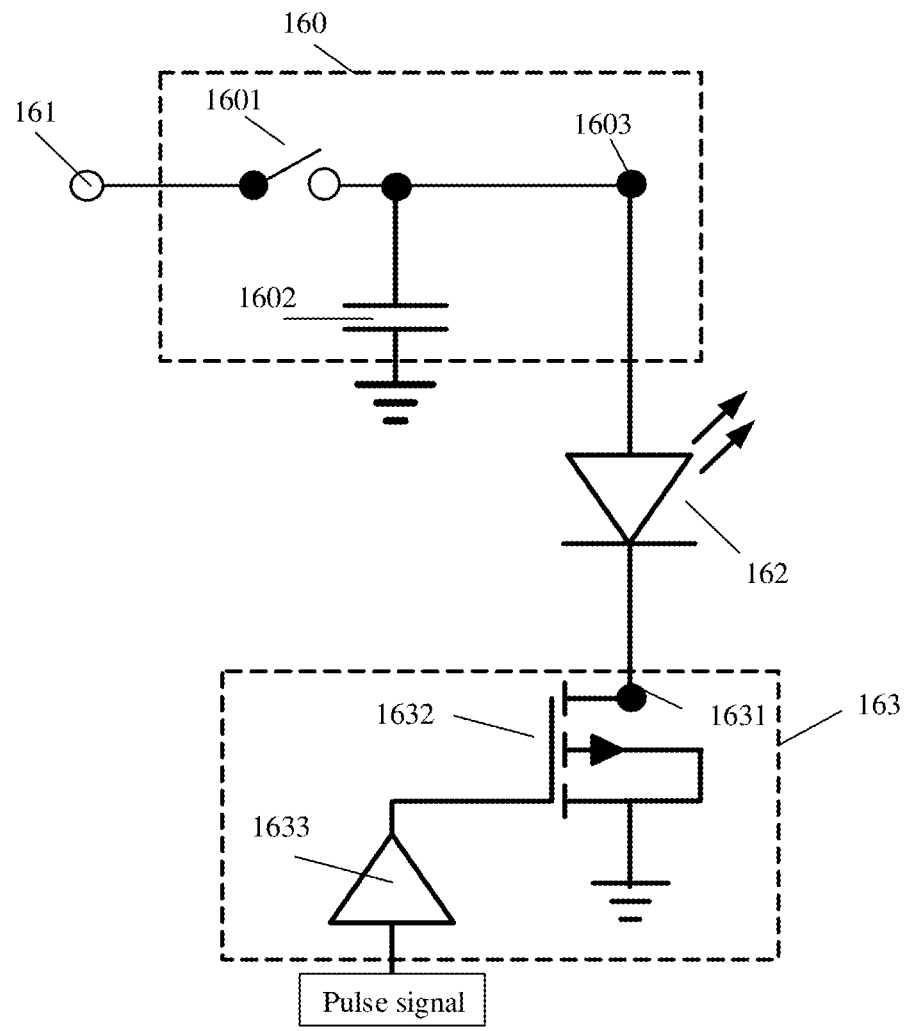
FIG. 16 is a schematic diagram of a laser drive circuit according to an embodiment of this application.

FIG. 16 is a schematic circuit diagram of a laser drive circuit according to an embodiment of this application. FIG. 16 is a schematic diagram of a laser drive circuit including a control unit 160 and a voltage input end 161.

The control unit includes a first switch module 1601, a capacitive module 1602, and a first connection end 1603. The first connection end 1603 is configured to connect to a positive electrode of a laser.

The control unit 160 is disposed in a charge loop of the laser drive circuit. Specifically, one end of the first switch module 1601 is electrically connected to the voltage input end 161, and the other end of the first switch module 1601 is electrically connected to the first connection end 1603. The first switch module 1601 is configured to select, based on a first control signal, a laser 162 corresponding to the control unit. One end of the capacitive module 1602 is electrically connected to the first connection end 1603, and the other end of the capacitive module 1602 is grounded.

It may be understood that the laser 162 may be included in a laser array corresponding to the laser driver array. The laser drive circuit in this embodiment of this application may not include the laser 162. An objective of the laser 162 shown in FIG. 16 is to more clearly explain a working principle of this embodiment of this application, and does not constitute a limitation on the laser drive circuit in this embodiment of this application.

In this embodiment of this application, the first switch module 1601 may include a gate, a drain, and a source. The gate may be configured to receive the first control signal. The first control signal may be information that can control the first switch module 1601 to be turned on or off, such as a square wave or a sine wave. The gate and the source may be adaptively connected to the voltage input end 161 and the first connection end 1603 based on an actual application.

The working principle of the laser drive circuit corresponding to FIG. 16 is as follows: When the first control signal controls the first switch module 1601 to be turned on, the capacitive module 1602 is charged. If a voltage of the first connection end 1603 is greater than a turn-on voltage of the laser 162, a current passes through the laser 162, and the laser 162 is selected to be turned on.

Optionally, as shown in FIG. 16, the laser drive circuit further includes a first pulse current generation unit 163.

The first pulse current generation unit 163 includes a second connection end 1631, and the first pulse current generation unit is configured to control, based on a pulse period of a second control signal, the second connection end 1631 to discharge periodically. The second connection end 1631 is configured to connect to a negative electrode of the laser.

When the laser is turned on, a pulse current is usually used to generate pulse light. Therefore, in this embodiment of this application, the laser drive circuit may further include the first pulse current generation unit 163. The first pulse current generation unit 163 may enable the second connection end 1631 to discharge periodically. When the second connection end 1631 discharges periodically, if the laser 162 connected to the second connection end 1631 is selected, a current periodically flows through the laser 162, in other words, a pulse current flows through the laser 162, so that the laser 162 can generate pulse light.

Optionally, the first pulse current generation unit 163 further includes a first field-effect module 1632 and a drive module 1633 corresponding to the first field-effect module. The drive module 1633 corresponding to the first field-effect module is configured to receive the second control signal. The first field-effect module 1632 is configured to control, based on the pulse period of the second control signal, the second connection end to discharge periodically.

In this embodiment of this application, the second control signal may be a pulse signal, and the second control signal may control the first field-effect module 1632 to be periodically turned off or turned on. When the first field-effect module 1632 is turned on, the second connection end 1631 is grounded to discharge.

It may be understood that, in a specific application, a resistor or the like may be further added between the first field-effect module 1632 and a ground terminal based on an actual application scenario, to reduce a current that flows through the laser 162 when the first field-effect module 1632 is turned on. This is not specifically limited in this embodiment of this application.

Figure 17:
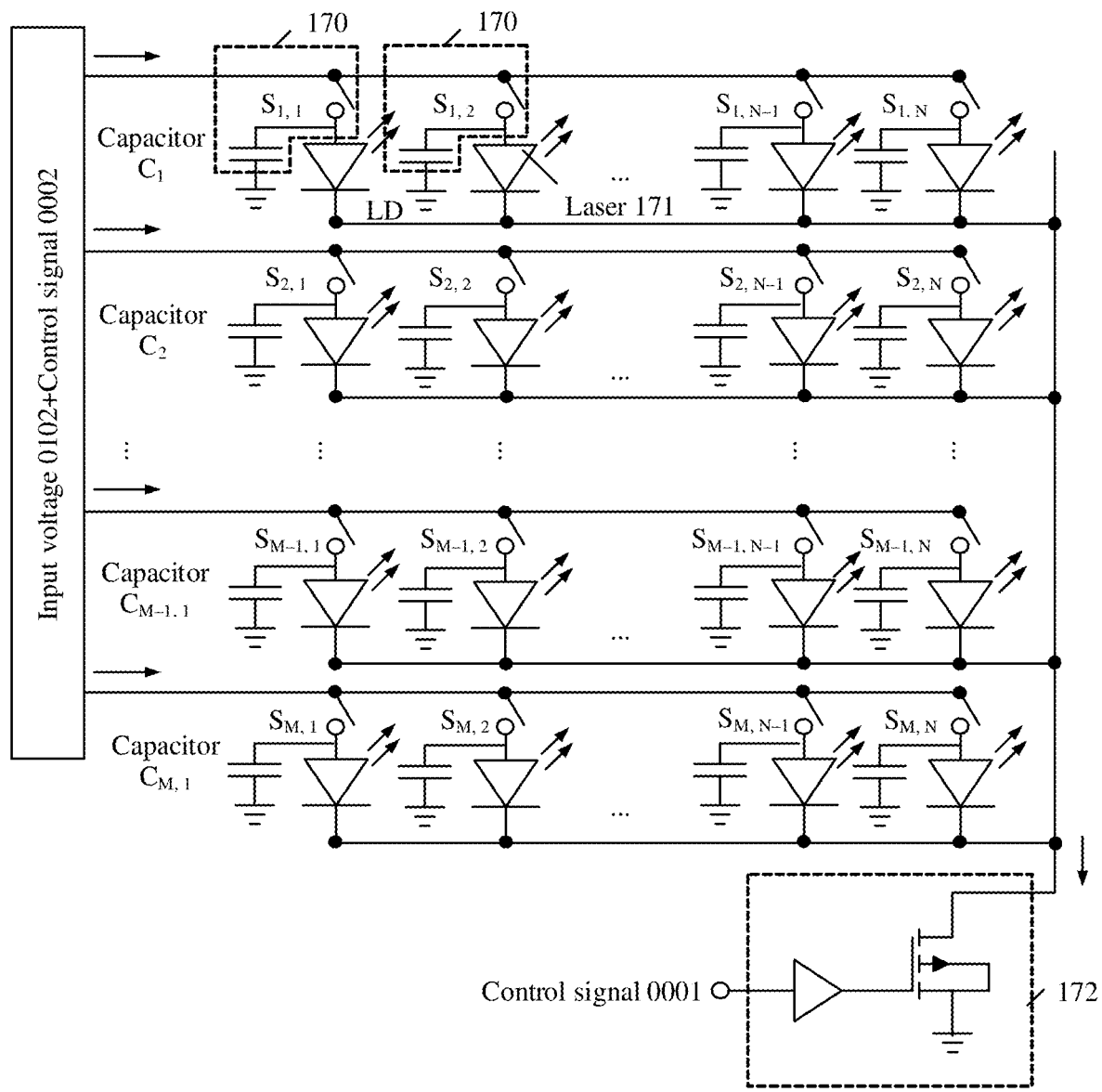
FIG. 17 is a schematic diagram of another laser drive circuit according to an embodiment of this application.

FIG. 17 is a schematic circuit diagram of another laser drive circuit according to an embodiment of this application. FIG. 17 is a schematic diagram of a laser drive circuit including M*N control units 170. M and N may be set based on an actual application scenario. This is not specifically limited in this embodiment of this application.

As shown in FIG. 17, each control unit 170 is configured to control one laser, M*N lasers correspond to M*N control units 170, and negative electrodes (or referred to as N-electrodes) of the M*N lasers are all connected.

For a switch module, a capacitive module, and a connection end configured to connect to a positive electrode of a laser in the control unit 170, refer to descriptions of the embodiment in FIG. 16.

In a specific process implementation, capacitive modules of the control units 170 in this embodiment of this application may be set as a capacitive module array, switch modules may be set as a switch array, and an electrical connection relationship in this embodiment of this application is implemented by using an adaptive process. A specific form of the laser drive circuit is not limited in this embodiment of this application.

A first control signal 0002 may control the switch module in each control unit 170 to turn on or turn off, to control selection of the lasers.

In this embodiment of this application, the control units 170 are disposed in a charge loop of the laser drive circuit, and turning on of a switch module in any control unit 170 does not cause an incorrect current to be generated in another laser. Therefore, a plurality of lasers can be flexibly driven.

Optionally, as shown in FIG. 17, the laser drive circuit may further include a pulse current generation unit 172. For the pulse current generation unit 172, specifically refer to descriptions of the embodiment in FIG. 16.

A second control signal 0001 may control a field-effect transistor of the pulse current generation unit 172 to be periodically turned on, so that in a selected laser, an input voltage 0102, a capacitive module in a turned-on control unit 170, and the laser controlled by the turned-on control unit 170 form a discharge loop, a pulse current flows through the laser, and the laser may be selected and turned on.

Figure 18:
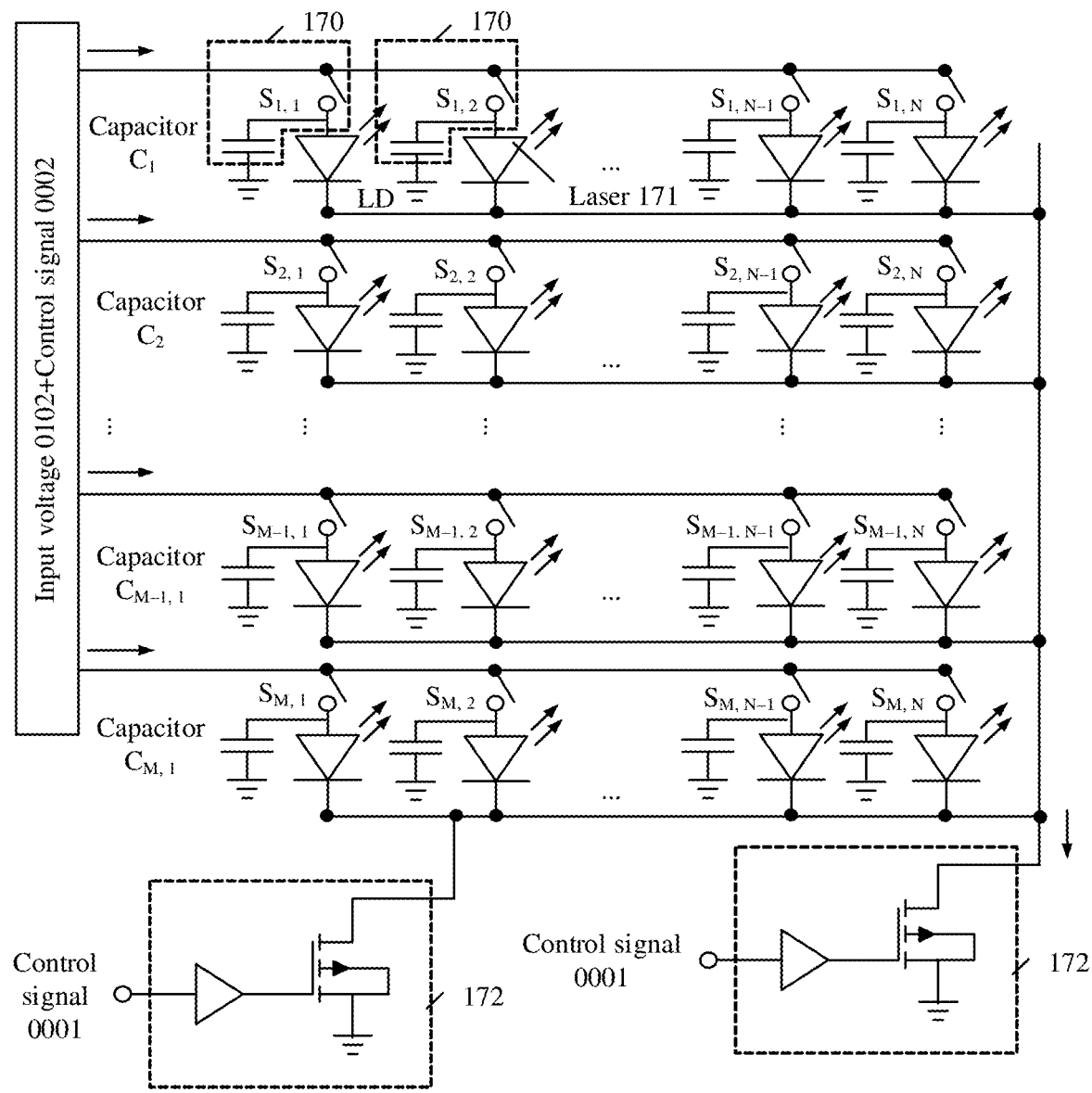
FIG. 18 is a schematic diagram of still another laser drive circuit according to an embodiment of this application.

Optionally, as shown in FIG. 18, the laser drive circuit may further include a plurality of pulse current generation units 172.

In a specific application, a plurality of lasers may be turned on at the same time. In this case, a plurality of currents converge in the field-effect transistor of the pulse current generation unit 172. This may cause overcurrent of the pulse current generation unit 172 and damage the pulse current generation unit 172.

Therefore, in this embodiment of this application, the plurality of pulse current generation units 172 are disposed in the laser drive circuit, and the plurality of pulse current generation units 172 are jointly controlled by the second control signal 0001, so that a shunt function can be achieved to protect the pulse current generation units 172.

It may be understood that, in an actual application, a quantity of pulse current generation units 172 may be set based on an actual application scenario. This is not specifically limited in this embodiment of this application.

Figure 19:
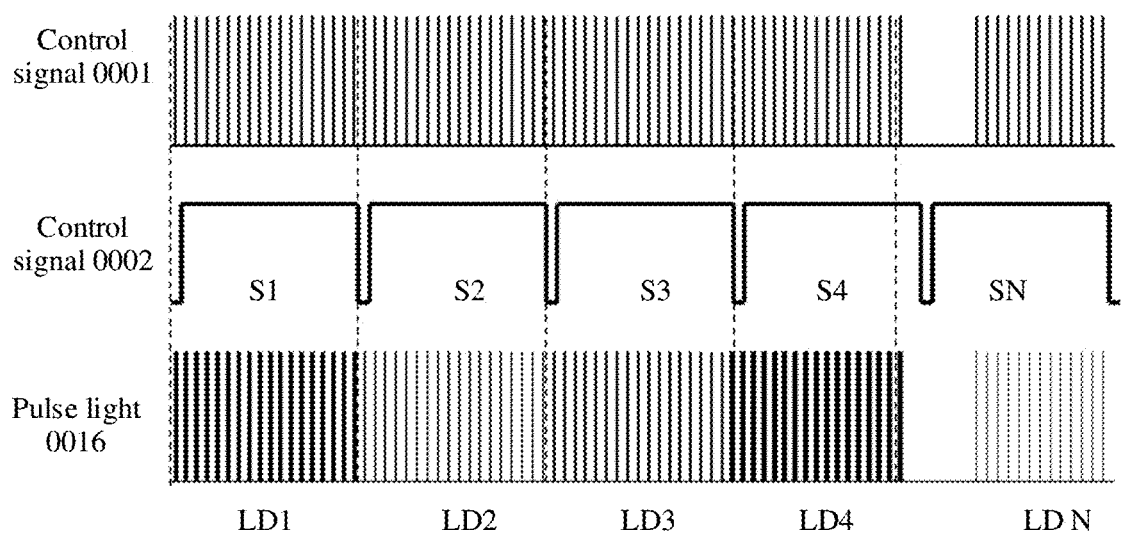
FIG. 19 is a diagram of a working time sequence of a laser drive circuit according to an embodiment of this application.

FIG. 19 shows a working time sequence diagram of the laser drive circuit corresponding to FIG. 17 or FIG. 18.

As shown in FIG. 19, the second control signal 0001 may be a pulse signal, and is used to help a laser generate a pulse current. The first control signal 0002 may be a rectangular wave, and may be used to select a laser, control a scanning frequency of the laser, and select different scanning manners. A high level of each period of the first control signal 0002 may enable a switch module SN in a control unit to be turned on, a pulse current may flow in a laser LDN controlled by the SN, and a voltage of a voltage input end may control a peak value of the pulse current. Therefore, the laser LDN may emit pulse light 0016.

Figure 20:
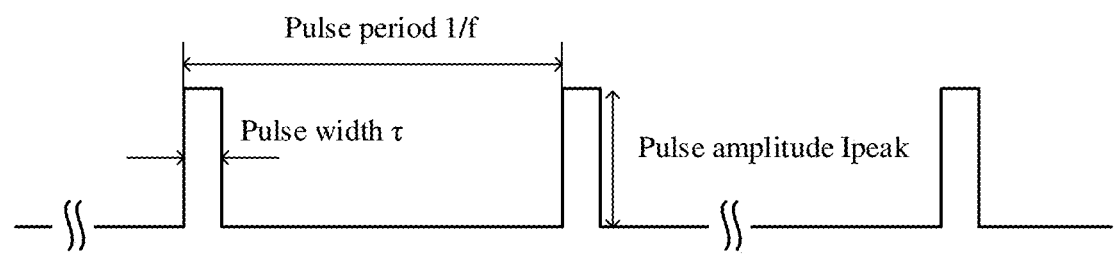
FIG. 20 is a schematic diagram of a square wave pulse signal.

For example, the second control signal 0001 may be a square wave pulse signal. FIG. 20 is a schematic diagram of a square wave pulse signal.

In the square wave pulse signal, a pulse repetition frequency f may be optional in a range of 1 kHz to 1 GHz, for example, may be 200 kHz; a pulse width τ may be optional in a range of 1 ns to 1 ms, for example, may be 5 ns; and a pulse duty factor may be optional in a range of 0.01% to 50%, for example, may be 1%. An amplitude Ipeak of a pulse current may be optional in a range of 0 to 50 A, for example, may be 20 A. The duty factor may be τ/(1/f), in other words, τ×f.

It should be noted that the first control signal 0002 may be used to turn on the switch modules in the plurality of control units based on an actual application scenario through program setting, circuit building, or the like. This is not specifically limited in this embodiment of this application.

Figure 21:
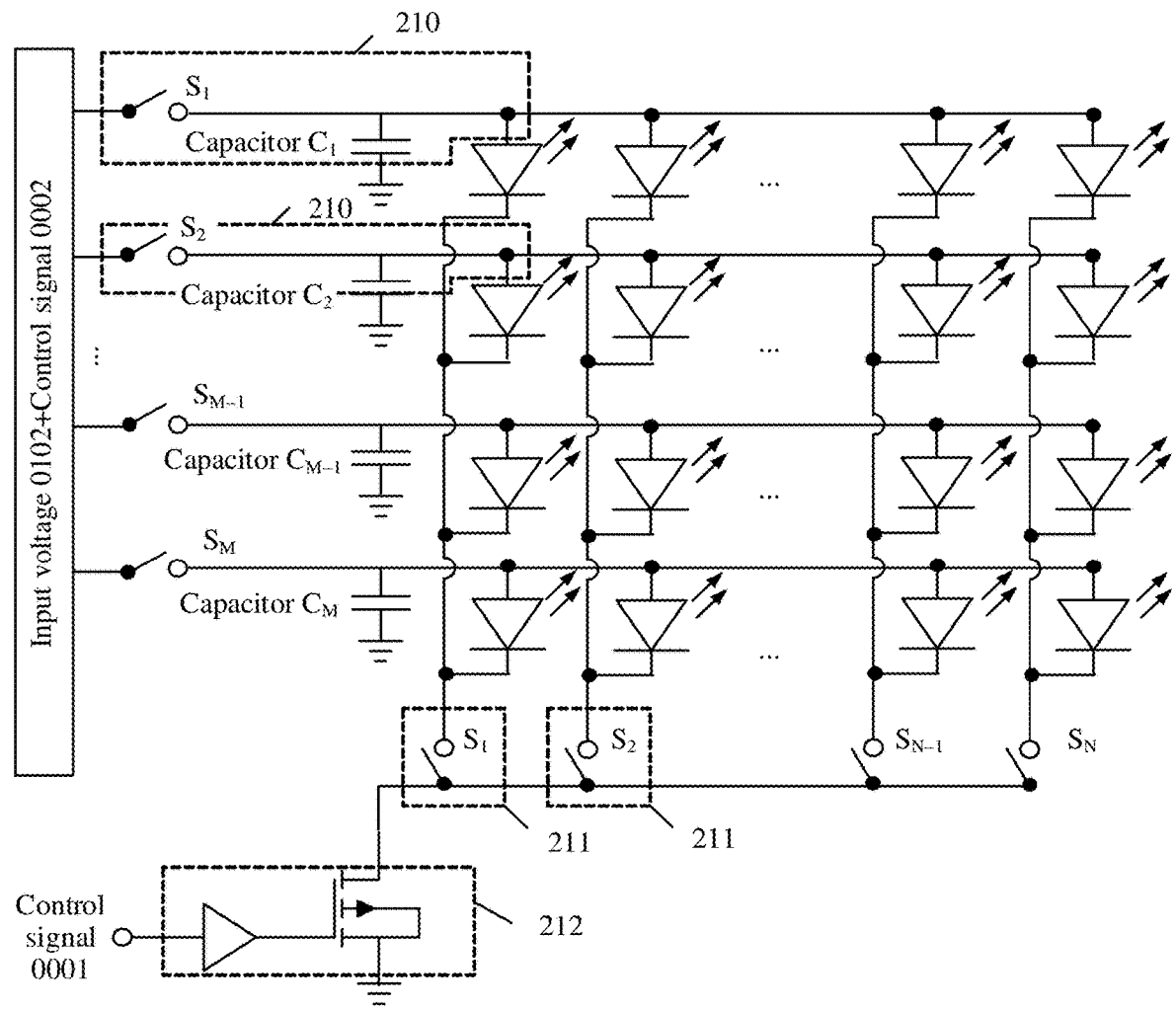
FIG. 21 is a schematic diagram of yet another laser drive circuit according to an embodiment of this application.

FIG. 21 is a schematic circuit diagram of another laser drive circuit according to an embodiment of this application. FIG. 21 is a schematic diagram of a laser drive circuit including M control units 210 and N second switch modules 211. M and N may be set based on an actual application scenario. This is not specifically limited in this embodiment of this application.

In this embodiment of this application, in a laser array driven by the laser drive circuit, positive electrodes of each row of lasers are electrically connected, and each control unit 210 may select one row of lasers. Negative electrodes of each column of lasers are electrically connected, and each second switch module 211 may select one column of lasers. Any laser may be selected based on cooperation between the M control units 210 and the N second switch modules 211.

Optionally, the laser drive circuit in FIG. 21 may further include one or more second pulse current generation units 212. The one or more second pulse current generation units 212 are connected to the one or more second switch modules 211, so that a pulse current may flow through the selected laser.

A working principle of the laser drive module corresponding to FIG. 21 is similar to a working principle of the foregoing embodiment, and a difference lies in that the laser in FIG. 21 is selected based on cooperation between the M control units 210 and the N second switch modules 211. The working principle of the laser drive module in FIG. 21 is not described herein again.

Figure 22:
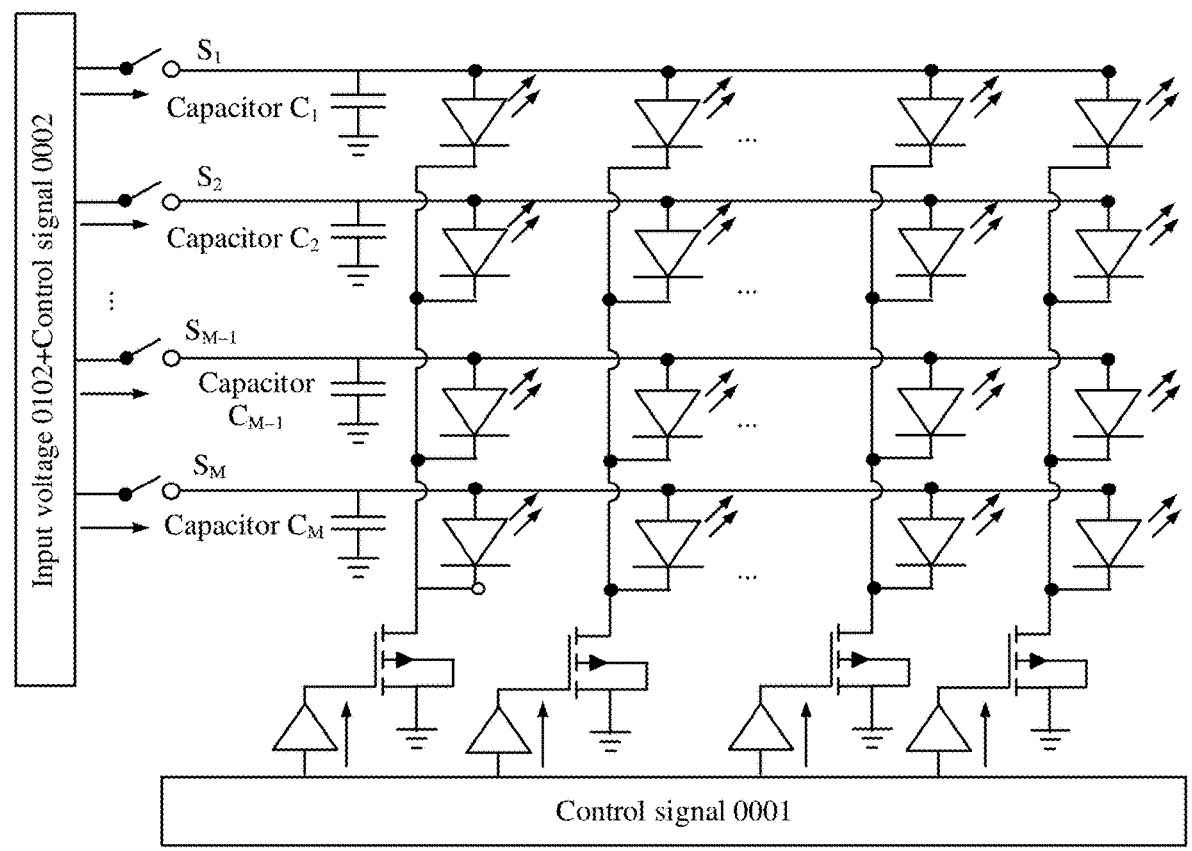
FIG. 22 is a schematic diagram of still yet another laser drive circuit according to an embodiment of this application.

FIG. 22 is a schematic circuit diagram of another laser drive circuit according to an embodiment of this application. Different from FIG. 21, a switch module configured to implement column selection is omitted in FIG. 22. After the negative electrodes of each column of lasers are electrically connected, the negative electrodes of each column of lasers may be connected to pulse current generation units, to implement flexible control of lasers in a unit of row. Alternatively, it may be considered that one or more rows of lasers in the laser drive circuit in FIG. 22 may be controlled each time.

Figure 23:
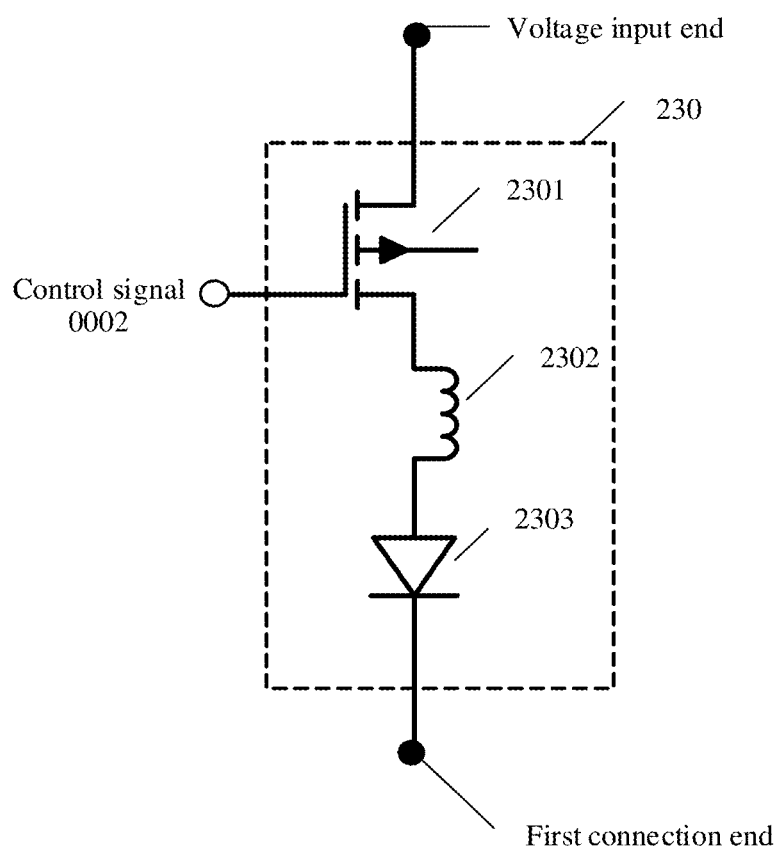
FIG. 23 is a schematic circuit diagram of a first switch module according to an embodiment of this application.

FIG. 23 is a schematic diagram of a first switch module according to an embodiment of this application. As shown in FIG. 23, a first switch module 230 includes a field-effect transistor 2301, an inductive electrical component 2302, and a unidirectionally-conducted electrical component 2303.

The field-effect transistor 2301, the inductive electrical component 2302, and the unidirectionally-conducted electrical component 2303 are connected in series. A gate of the field-effect transistor is configured to receive a first control signal, and a negative electrode of the unidirectionally-conducted electrical component is connected to a first connection end.

In this embodiment of this application, the first switch module is disposed in a charge loop of the laser drive circuit, which may cause a large power loss of the charge loop. Therefore, adaptive processing may be performed on the first switch module, to reduce the power loss of the charge loop.

Figure 24:
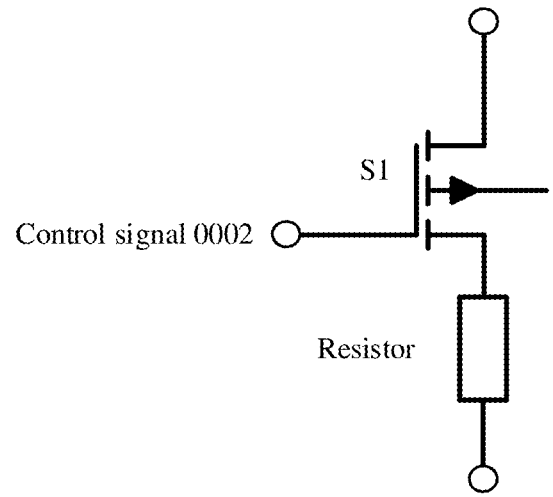
FIG. 24 is a possible schematic circuit diagram of a first switch module.

A manner that may be figured out to reduce the power loss may be as follows: As shown in FIG. 24, a resistor is connected in series to the charge loop, to reduce a charge peak current of the charge loop. However, the resistor R also has power consumption. Therefore, power consumption of the charge loop is still large.

Therefore, in this embodiment of this application, as shown in FIG. 23, the inductive electrical component is connected in series to the charge loop to form an LC circuit model, so that charge efficiency can be improved, and a requirement on an input voltage of the voltage input end can also be reduced. In order to restrain reverse oscillation of an LC circuit, the unidirectionally-conducted electrical component is connected in series to ensure a unidirectional flow of the pulse current.

The laser drive circuit in this embodiment of this application may be used in a depth obtaining component of a terminal device.

The depth obtaining component may include the laser driver array and the laser array in FIG. 17, FIG. 18, FIG. 21, or FIG. 22. The laser array includes the plurality of lasers. The laser driver array includes the one or more control units, and each control unit is configured to control selection of one or more lasers in the laser array. The control unit includes the first switch module, the capacitive module, and the first connection end. The first connection end is configured to connect to the positive electrode of the laser. The first switch module is configured to select, based on the first control signal, the laser corresponding to the control unit. One end of the first switch module is electrically connected to the voltage input end of the laser driver array, and the other end of the first switch module is electrically connected to the first connection end. One end of the capacitive module is electrically connected to the first connection end, and the other end of the capacitive module is grounded. In this embodiment of this application, the one or more control units are disposed in the charge loop of the laser driver array, and a laser corresponding to the control unit can be flexibly selected based on the first switch module and the capacitive module in the control unit. In this way, scanning laser emission of the laser array can be implemented based on the laser driver array, no scanning device such as the micro electro mechanical systems mirror needs to be additionally disposed, and circuit support can be provided for implementing a small-sized, power-efficient, and cost-effective optical transmit end.

The terminal device may include a mobile phone, a tablet computer, a wearable electronic device (such as a smartwatch) having a wireless communication function, a camera, or the like.

Figure 25:
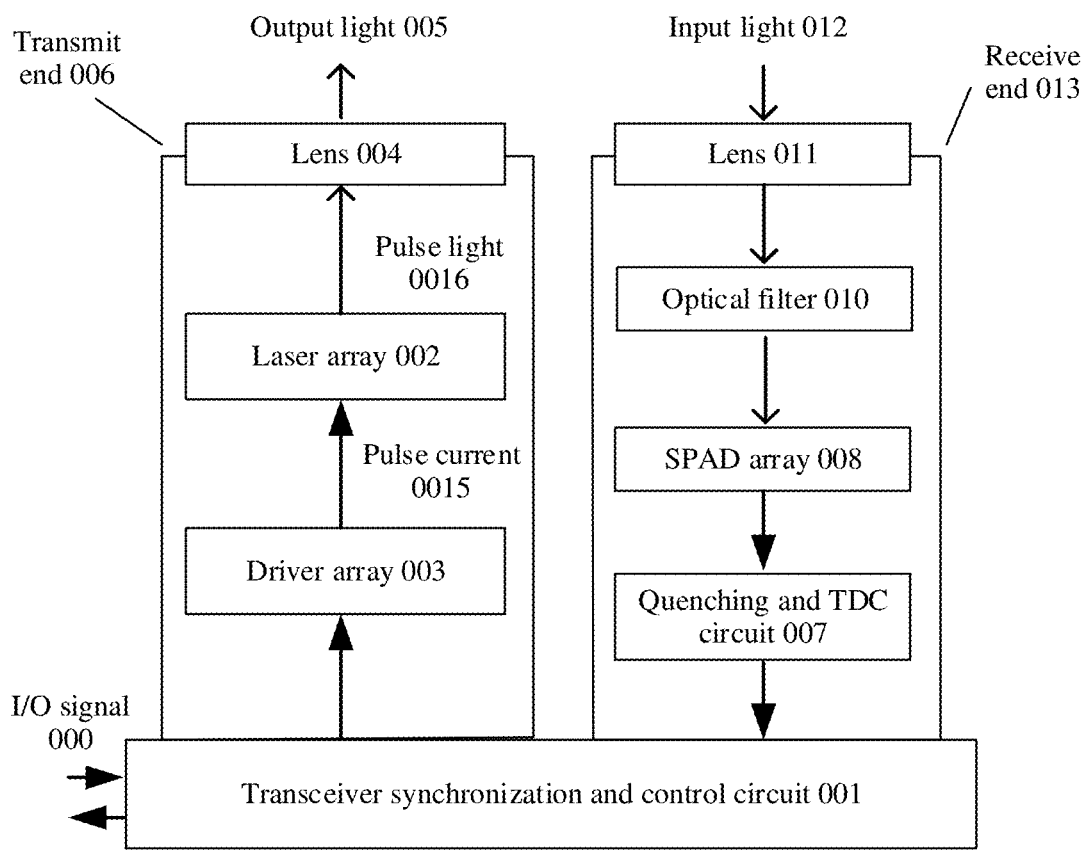
FIG. 25 is a schematic diagram of a working principle of a depth obtaining component according to an embodiment of this application.

FIG. 25 is a schematic diagram of a working principle of a depth obtaining component. As shown in FIG. 25, the depth obtaining component may include a transmit end 006 and a receive end 013.

The transmit end 006 may include a driver array 003, a laser array 002, and a lens 004. The driver array 003, the laser array 002, and the lens 004 may be placed on a base of the transmit end.

The driver array 003 may include any laser drive circuit in the foregoing embodiments.

During working, a transceiver synchronization and control circuit 001 sends a pulse electrical signal to the driver array 003. The driver array 003 amplifies the pulse electrical signal into a pulse current 0015, and then outputs the pulse current 0015 to the laser array 002. The laser array 002 converts the pulse current into a pulse light 0016. The pulse light 0016 passes through the lens 004. A light beam is adjusted to an expected light beam shape (including a divergence angle, a light pattern size, and a light beam angle), and then output light 005 is emitted.

Sensors at the receive end 013 include a lens 011, an optical filter 010, a single photon avalanche diode (SPAD) array 008, and a quenching and time-to-digital conversion circuit (TDC) 007. This embodiment of this application may not relate to improvement of the receive end, and a specific structure and content of the receive end 013 are not described herein.

When the depth obtaining component in this embodiment of this application is used in a mobile phone, a distance for obtaining a depth image may be greater than 10 m, and power consumption may be less than 1 W, so that requirements on a hardware size and power consumption in the mobile phone can be met. In addition, because the depth obtaining component in this embodiment of this application does not include the micro electro mechanical systems mirror, there is no reliability problem of the micro electro mechanical systems mirror solution, and reliability is high.

It may be understood that, in this embodiment of this application, a laser may be flexibly selected with reference to a specific application scenario. For example, when a depth image of a still object, such as a building, a scenery, or a posed object, is photographed, one laser may be turned on each time, to implement block-by-block scanning. When a moving object, for example, a moving person or object, is photographed, a plurality of lasers may be turned on each time to implement scanning of a plurality of blocks, or all lasers may be turned on at a time to implement quick depth obtaining. In this way, a depth obtaining error caused by displacement of the moving object is avoided.

The foregoing implementations, schematic structural diagrams, or schematic emulation diagrams are only examples for describing the technical solutions of this application. Size proportions thereof do not constitute any limitation on the protection scope of the technical solutions. Any modification, equivalent replacement, improvement, and the like made within the spirit and principle of the foregoing implementations shall fall within the protection scope of the technical solutions.

What is claimed is:

1. A depth obtaining apparatus, comprising a laser driver array and a laser array, wherein the laser array comprises a plurality of lasers, the laser driver array comprises a plurality of control units, and each control unit of the plurality control units is configured to control selection of one or more lasers in the laser array;
    the each control unit comprises a first switch module, a capacitive module, and a first connection end;
    the first connection end is configured to connect to a positive electrode of the one or more lasers;
    the first switch module is configured to select, based on a first control signal, a laser corresponding to the each control unit, the one or more lasers includes the laser, one end of the first switch module is electrically connected to a voltage input end of the laser driver array, and the other end of the first switch module is electrically connected to the first connection end; and
    one end of the capacitive module is electrically connected to the first connection end, and the other end of the capacitive module is grounded,
    wherein the each control unit is configured to select a row of lasers in the laser array, and positive electrodes of the row of lasers are electrically connected;
    the laser drive circuit further comprises one or more second switch modules;
    each second switch module of the one or more second switch modules is configured to select one column of lasers in the laser array, and the each second switch module is electrically connected to negative electrodes of the column of lasers, and
    the one or more second switch modules and the first switch modules of the plurality of control units are configured to cooperate with each other to select any laser in the laser array.

2. The depth obtaining apparatus according to claim 1, wherein the first switch module comprises a field-effect transistor, an inductive electrical component, and a unidirectionally-conducted electrical component;
    the field-effect transistor, the inductive electrical component, and the unidirectionally-conducted electrical component are connected in series;
    a gate of the field-effect transistor is configured to receive the first control signal; and
    a negative electrode of the unidirectionally-conducted electrical component is connected to the first connection end.

3. The depth obtaining apparatus according to claim 1, further comprising one or more first pulse current generation units, wherein
    each first pulse current generation unit of the one or more first pulse current generation units comprises a second connection end, the each first pulse current generation unit is configured to control, based on a pulse period of a second control signal, the second connection end to discharge periodically, and the second connection end is configured to connect to a negative electrode of the laser.

4. The depth obtaining apparatus according to claim 3, wherein the each first pulse current generation unit further comprises a first field-effect module and a drive module corresponding to the first field-effect module;
    the drive module corresponding to the first field-effect module is configured to receive the second control signal; and
    the first field-effect module is configured to control, based on the pulse period of the second control signal, the second connection end to discharge periodically.

5. The depth obtaining apparatus of claim 1, wherein negative electrodes of the plurality of lasers are electrically connected, and each of the control units is configured to control one laser.

6. The depth obtaining apparatus according to claim 1, wherein the laser drive circuit further comprises one or more second pulse current generation units; and each second pulse current generation unit of the one or more second pulse current generation units is connected to the one or more second switch modules, and the each second pulse current generation unit is configured to control, based on a pulse period of a third control signal, a laser connected to the one or more second switch modules to discharge periodically.

7. The depth obtaining apparatus according to claim 6, wherein the each second pulse current generation unit further comprises a second field-effect module and a drive module corresponding to the second field-effect module;

the drive module corresponding to the second field-effect module is configured to receive the third control signal; and the second field-effect module is configured to control, based on the pulse period of the third control signal, the laser connected to the one or more second switch modules to discharge periodically.

8. The depth obtaining apparatus according to claim 1, wherein the second switch module comprises a third field-effect module and a drive module corresponding to the third field-effect module;

the drive module corresponding to the third field-effect module is configured to receive a fourth control signal; and the third field-effect module is configured to control, based on a pulse period of the fourth control signal, a laser corresponding to the third field-effect module to discharge periodically.

9. An electronic device, comprising the depth obtaining apparatus according to claim 1, wherein the electronic device comprises a mobile phone, a tablet computer, a wearable electronic device, or a camera.

10. The depth obtaining apparatus according to claim 1, wherein the one end of the capacitive module is electrically connected to the first connection end at a point between the first switch module and the first connection end.

* * * * *